(12) United States Patent
Yoon et al.

(10) Patent No.: US 12,249,716 B2
(45) Date of Patent: Mar. 11, 2025

(54) ACRYLIC BINDER FOR LITHIUM-SULFUR SECONDARY BATTERY CATHODE AND USE THEREOF

(71) Applicant: LG CHEM, LTD., Seoul (KR)

(72) Inventors: Jeong Ae Yoon, Daejeon (KR); Yu Mi Kim, Daejeon (KR); Choong Hyeon Lee, Daejeon (KR); Doo Kyung Yang, Daejeon (KR); Sung Soo Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 225 days.

(21) Appl. No.: 16/335,643

(22) PCT Filed: Sep. 26, 2017

(86) PCT No.: PCT/KR2017/010581
§ 371 (c)(1),
(2) Date: Mar. 21, 2019

(87) PCT Pub. No.: WO2018/056782
PCT Pub. Date: Mar. 29, 2018

(65) Prior Publication Data
US 2020/0161658 A1 May 21, 2020

(30) Foreign Application Priority Data
Sep. 26, 2016 (KR) .................. 10-2016-0122911

(51) Int. Cl.
*H01M 4/62* (2006.01)
*H01M 4/02* (2006.01)
*H01M 4/36* (2006.01)
*H01M 4/38* (2006.01)
*H01M 4/587* (2010.01)
*H01M 10/052* (2010.01)

(52) U.S. Cl.
CPC ........... *H01M 4/622* (2013.01); *H01M 4/364* (2013.01); *H01M 4/38* (2013.01); *H01M 4/587* (2013.01); *H01M 10/052* (2013.01); *H01M 2004/028* (2013.01)

(58) Field of Classification Search
CPC ........ H01M 4/62; H01M 4/621; H01M 4/622; H01M 4/13; H01M 4/364; H01M 4/38; H01M 4/587; H01M 10/052; H01M 2004/028; Y02E 60/10
See application file for complete search history.

(56) References Cited

U.S. PATENT DOCUMENTS

| | | |
|---|---|---|
| 5,523,340 A | 6/1996 | Niu et al. |
| 6,019,802 A | 2/2000 | Ishizuka et al. |
| 10,170,766 B2 | 1/2019 | Son et al. |
| 2003/0073000 A1* | 4/2003 | Lee .......... H01M 4/622 429/218.1 |
| 2011/0287305 A1 | 11/2011 | Scordilis-Kelley et al. |
| 2012/0183848 A1* | 7/2012 | Kang .................. H01M 4/0404 526/216 |
| 2014/0239239 A1* | 8/2014 | Cha .......... H01M 4/134 525/218 |
| 2015/0200398 A1 | 7/2015 | Yeou et al. |
| 2015/0221935 A1 | 8/2015 | Zhou et al. |
| 2016/0177136 A1* | 6/2016 | Park .......... C09J 7/385 429/185 |
| 2016/0190561 A1* | 6/2016 | Son ................. H01M 10/052 429/188 |
| 2018/0301744 A1* | 10/2018 | Fukumine .............. C08L 33/08 |

FOREIGN PATENT DOCUMENTS

| | | |
|---|---|---|
| CN | 102074704 A | 5/2011 |
| CN | 104078685 A | 10/2014 |
| CN | 104347843 A | 2/2015 |
| CN | 104466187 A | 3/2015 |
| CN | 105580187 A | 5/2016 |
| CN | 105765775 A | 7/2016 |
| CN | 105870455 A | 8/2016 |
| JP | 06096770 A * | 4/1994 |
| JP | 2012-151108 A | 8/2012 |
| JP | 2016-528692 A | 9/2016 |
| KR | 2003-0032364 A | 4/2003 |
| KR | 10-1161145 B1 | 6/2012 |
| KR | 10-2014-0073936 A | 6/2014 |
| KR | 10-2015-0061874 A | 6/2015 |
| KR | 10-2015-0083724 A | 7/2015 |
| KR | 10-2016-0007413 A | 1/2016 |

(Continued)

OTHER PUBLICATIONS

Zhang, S.S. and D.T. Tran, "Pyrite FeS2 as an efficient adsorbent of lithium polysulphide for improved lithium-sulphur batteries", Journal of Materials Chemistry A, vol. 4, p. 4371, published Feb. 23, 2016. (Year: 2016).*

(Continued)

*Primary Examiner* — Stewart A Fraser
*Assistant Examiner* — Lilia Nedialkova
(74) *Attorney, Agent, or Firm* — Birch, Stewart, Kolasch & Birch, LLP

(57) ABSTRACT

A binder for a lithium-sulfur secondary battery cathode, a composition containing the same, and an acrylic binder capable of forming a cross-linked network and a use thereof. The binder contains a polar functional group capable of strongly interacting with sulfur.

13 Claims, No Drawings

(56) References Cited

FOREIGN PATENT DOCUMENTS

WO    WO 2008/023895 A1    2/2008
WO    WO 2012/160762 A1    11/2012

OTHER PUBLICATIONS

Machine translation of Japanese Patent Publication No. H06-096770, published Apr. 1994. (Year: 1994).*
International Search Report for PCT/KR2017/010581 (PCT/ISA/210) mailed on Jan. 12, 2018.
European Search Report for Appl. No. 17853496.2 dated Sep. 26, 2019.
European Communication pursuant to Article 94(3) EPC for European Application No. 17853496.2, dated Aug. 7, 2020.
Koßmehl et al., "Hydrogels based on N-vinyl-2-pyrrolidinone and 2-hydroxyethyl methacrylate," Makromol. Chem., vol. 190, 1989, pp. 1253-1262, 10 pages total.
Zhu et al., "Enhanced electrochemical performance from cross-linked polymeric network as binder for Li—S battery cathodes," Journal of Applied Electrochemistry, vol. 46, 2016, pp. 725-733 (Abstract Only, 2 pages total).

\* cited by examiner

ACRYLIC BINDER FOR LITHIUM-SULFUR SECONDARY BATTERY CATHODE AND USE THEREOF

TECHNICAL FIELD

This application relates to an acrylic binder for a lithium-sulfur secondary battery cathode, a composition thereof, a lithium-sulfur secondary battery cathode and a use thereof.

BACKGROUND ART

Cross-Reference to Related Applications

The present application claims the benefit of priority based on Korean Patent Application No. 10-2016-0122911 filed on Sep. 26, 2016, the disclosure of which is incorporated herein by reference in its entirety.

As the application area of the secondary battery is extended to the electric vehicle (EV) or the energy storage system (ESS), and the like, the lithium-ion secondary battery has reached a limit situation with a relatively low specific gravimetric energy storage density (~250 Wh/kg).

Among the next generation secondary battery technologies capable of achieving high energy density, lithium-sulfur secondary batteries have attracted attention due to the higher commercialization potential compared to other technologies.

The lithium-sulfur secondary battery means a battery system using sulfur as a cathode active material and lithium metal as an anode active material.

When the lithium-sulfur secondary battery is discharged, sulfur in the cathode receives electrons and is reduced, and lithium in the anode is oxidized and ionized. The sulfur reduction reaction is a process in which a sulfur-sulfur (S—S) bond accepts two electrons and is converted to sulfur anion forms, where lithium ions formed by the oxidation are transferred to the cathode through an electrolyte to form salts with the ionized sulfur.

The sulfur prior to discharge has a cyclic $S_8$ structure and is converted into lithium polysulfide ($LiS_x$) by a reduction reaction, where the lithium polysulfide ($LiS_x$) is reduced in a stepwise fashion and finally becomes lithium sulfide ($Li_2S$).

The theoretical energy density through such an electrochemical reaction is 2,500 Wh/kg, which is 10 times higher than that of lithium ion batteries.

Despite such an advantage of the lithium-sulfur secondary battery, however, there are many problems such as high solubility of lithium polysulfide, low lifetime characteristics and output characteristics, low electrical conductivity of sulfur, and poor stability due to the use of lithium metal.

In one example, it is considered as the biggest challenge to be solved in the lithium-sulfur secondary battery that the lithium polysulfide ($LiS_x$) easily dissolves in the electrolyte, so that the active sulfur is lost through the repetitive charging and discharging and that the cycle performance is deteriorated as a result.

In order to solve the above problems, a technique of manufacturing an electrode as a porous body and then supporting sulfur between the porous bodies to inhibit dissolution possibility for the electrolyte, a technique of introducing a substance capable of adsorbing polysulfide into the electrode or a technique using the hydrophilic property of polysulfide, and the like have been proposed.

However, there is still a need for continuous research on the lithium-sulfur secondary battery having excellent electrochemical performances while desired effectively preventing the elution of lithium polysulfide ($LiS_x$).

PRIOR ARTS

Patent Literatures (Patent literature 0001) Korean patent publication No. 2015-0093874.

DISCLOSURE

Technical Problem

The present application provides an acrylic binder for a lithium-sulfur secondary battery cathode having excellent cycle characteristics by effectively preventing the dissolution of a cathode active material.

In addition, the present application provides a composition for forming an active layer of a cathode for a lithium-sulfur secondary battery having excellent electrochemical performances, which can assist in homogeneous dispersion of conductive material and the formation of a secondary structure of it.

Furthermore, the present application provides a cathode for a lithium-sulfur secondary battery having an active layer comprising such an acrylic binder, and a secondary battery comprising the same.

Technical Solution

The present invention relates to a binder for a lithium-sulfur secondary battery cathode, and a composition comprising the same.

The binder for a lithium-sulfur secondary battery cathode according to the present application may comprise a polymerized unit of a monomer within the binder which interacts with a cathode active material to primarily inhibit the elution of lithium polysulfide ($LiS_x$), which have been formed by the reduction of the cathode active material, specifically, sulfur in the cathode, into an electrolyte.

Also, the binder for a lithium-sulfur secondary battery cathode according to the present application may comprise a polymerized unit of a monomer having a predetermined cross-linkable functional group in the binder and realize a cross-linked structure by a cross-linking agent contained in the composition to additionally inhibit the elution of the above-described cathode active material. In particular, such a cross-linked structure can be induced during the drying process of the electrode to form a three-dimensional network structure without any additional process.

Furthermore, the binder for a lithium-sulfur secondary battery cathode can promote uniform dispersion, and the formation and maintenance of the secondary structure of carbon used as a conductive material.

The term "acrylic binder" in the present application means a polymer containing at least 30% by weight of polymerized units of an acrylic monomer and serving as a binder of the secondary battery. Here, the acrylic monomer means acrylic acid, methacrylic acid or a derivative thereof.

That is, the acrylic binder of the present application is included in the active layer of the lithium-sulfur secondary battery cathode to perform a role in binding the cathode active material, the conductive material, and other materials contained in the active layer.

The acrylic binder comprises polymerized units of a first polymerizable monomer having a polar functional group interacting with the cathode active material and polymerized units of a second polymerizable monomer having a cross-linkable functional group.

The term "polymerized unit of a polymerizable monomer" in the present application may mean a state in which the polymerizable monomer is polymerized in a skeleton such as a side chain or a main chain of a polymer formed by polymerizing the polymerizable monomer.

The acrylic binder comprises a first polymerizable monomer having a polar functional group interacting with the cathode active material. It can be understood that the interaction between the polar functional group and the cathode active material comprises all known physical or chemical interactions that can prevent the dissolution of lithium polysulfide ($LiS_x$).

In one example, the interaction of the polar functional group with the cathode active material may be, but is not limited to, an interaction between the polar functional group and the sulfur element, specifically, the dipole-dipole moment or the like.

Through such an interaction between the cathode active material of the lithium-sulfur secondary battery and the polar functional group in the acrylic binder, it is possible to effectively prevent the dissolution of lithium polysulfide ($LiS_x$), which is formed by the reduction of the sulfur in the cathode, into the electrolyte.

The polar functional group may be utilized without limitation as long as the above-described objects can be achieved, but may be, for example, one or more selected from the group consisting of an amide group, a nitrile group and an alkylene oxide group.

In one example, the polymerizable monomer having a polar functional group can be exemplified by (meth)acrylonitrile, (meth)acrylamide, N-methylacrylamide, N,N-dimethyl (meth)acrylamide, N-butoxymethyl (meth)acrylamide, N-vinylpyrrolidone, N-vinylcaprolactam, alkoxyalkylene_glycol (meth)acrylic acid ester, alkoxydialkyleneglycol (meth)acrylic acid ester or alkoxypolyethyleneglycol (meth)acrylic acid ester, and the like.

The acrylic binder also comprises polymerized units of a second polymerizable monomer having a cross-linkable functional group.

The cross-linkable functional group serves to impart a cross-linked structure of the binder by a cross-linking agent to be described below.

The kind of the cross-linkable functional group is not particularly limited as long as the above-mentioned object can be achieved, but may be, as the functional group excluding the polar functional group, for example, one or more selected from the group consisting of an amine group, a hydroxy group, a carboxy group, an epoxy group and a vinyl group.

In a specific example, the second polymerizable monomer having a cross-linkable functional group can be exemplified by an amine group-containing monomer such as 2-aminoethyl (meth)acrylate, 3-aminopropyl (meth)acrylate, N,N-dimethylaminoethyl (meth)acrylate or N,N-dimethylaminopropyl (meth)acrylate; hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate; a hydroxy group-containing monomer such as hydroxypolyethylene glycol (meth)acrylate or hydroxypolypropylene glycol (meth)acrylate; a carboxy group-containing monomer such as methyl(meth)acrylic acid; an epoxy group-containing monomer such as glycidyl (meth)acrylate; or a vinyl group-containing monomer such as 2-vinyloxyethyl (meth)acrylate or 2-[2-(vinyloxy)ethoxy]ethyl (meth)acrylate, and the like.

The first polymerizable monomer and the second polymerizable monomer may be contained in the acrylic binder at a predetermined polymerized unit ratio.

In one example, the acrylic binder may comprise polymerized units of 30 to 99.5 parts by weight of the first polymerizable monomer and polymerized units of 0.5 to 30 parts by weight of the second polymerizable monomer.

In the present application, the term "part by weight" may mean a weight ratio between the respective components, unless otherwise specified.

In another example, the acrylic binder may comprises polymerized units of 40 to 98 parts by weight of the first polymerizable monomer and polymerized units of 2 to 25 parts by weight of the second polymerizable monomer, or polymerized units of 50 to 97 parts by weight of the first polymerizable monomer and polymerized units of 5 to 20 parts by weight of the second polymerizable monomer.

The acrylic binder of the present application may further comprise a polymerized unit of an acrylic monomer, specifically alkyl (meth)acrylate, in order to control the weight average molecular weight and the glass transition temperature.

In one example, the alkyl (meth)acrylate is (meth)acrylate having 1 to 20 carbon atoms, which can be exemplified by methyl (meth)acrylate, ethyl (meth)acrylate, n-propyl (meth)acrylate, isopropyl (meth)acrylate, n-butyl (meth)acrylate, t-butyl (meth)acrylate, isobutyl (meth)acrylate, 2-ethylhexyl (met)acrylate, 2-ethylbutyl (meth)acrylate, pentyl (meth)acrylate, hexyl (meth)acrylate, cyclohexyl (meth)acrylate, n-octyl (meth)acrylate, isooctyl (meth)acrylate, isononyl (meth)acrylate, decyl (meth)acrylate, dodecyl (meth)acrylate, tridecyl (meth)acrylate, tetradecyl (meth)acrylate, octadecyl (meth)acrylate or isobornyl (meth)acrylate, and the like, but is not limited thereto.

This alkyl (meth)acrylate may be contained in the binder, for example, in a polymerized unit ratio of 5 to 30 parts by weight or 10 to 30 parts by weight.

The acrylic binder according to the present application can be prepared in various ways.

For example, the acrylic binder may be prepared by blending the first polymerizable monomer having a polar functional group interacting with the above-mentioned cathode active material and the second polymerizable monomer having a cross-linkable functional group together with alkyl (meth)acrylate in an appropriate ratio and then applying a method such as known solution polymerization, bulk polymerization, suspension polymerization or emulsion polymerization thereto.

In one example, in the case of producing the acrylic binder by the solution polymerization method, the binder exhibits a particle diameter of 10 nm or less, may have more excellent adhesion force, and may also increase the content of the conductive material in the composition to secure electrochemical excellence.

In one example, in the case of producing the acrylic binder by the solution polymerization, the particle size of the acrylic binder can be adjusted to a range of 10 nm or less, whereby an appropriate peeling force to the current collector and excellent dispersibility to the conductive material can be achieved. The particle size of the acrylic binder may be measured using, for example, dynamic light scattering (DLS) equipment.

The solvent used for the solution polymerization of the acrylic binder is not particularly limited, but may be, preferably, a solvent having a boiling point of 110° C. or lower in order to use the solution as such without further purification process after solution polymerization. Such a solvent includes, for example, acetone, methanol, ethanol, acetonitrile, isopropanol, methyl ethyl ketone or water, and the like.

The acrylic binder of the present application may have a glass transition temperature in a range of −80° C. to 50° C. In such a glass transition temperature range, appropriate adhesiveness with the current collector can be secured, and retention capability for the conductive material, and the like, and resistance to the electrolyte can also be advantageously secured.

The acrylic binder of the present application may also have a weight average molecular weight ranging from 5,000 to 3,000,000. In the present application, the term weight average molecular weight may mean a value converted to standard polystyrene measured by GPC (Gel Permeation Chromatograph), and unless otherwise specified, the molecular weight of any polymer may mean the weight average molecular weight of the polymer. In another example, the acrylic binder may have a weight average molecular weight in the range of 10,000 to 1,000,000 or 100,000 to 500,000.

The polar functional group in the acrylic binder of the present application interacts with the cathode active material of the lithium-sulfur secondary battery. The interaction has a meaning including all known physical or chemical interactions, as described above, and specifically, may be an interaction between the polar functional group and the sulfur element.

The cathode active material is usually included in the cathode active layer of the lithium-sulfur secondary battery, and may have, for example, a compound comprising the sulfur element. The compound comprising the sulfur element may be, for example, a cyclic structure compound comprising eight sulfur atoms.

In the lithium-sulfur secondary battery, the compound comprising the sulfur element may have elution characteristics into an electrolyte due to the repetitive charge-discharge mechanism and also cause electrochemical problems due to low electric conductivity, and thus may exist in a state forming a composite with a material capable of improving such properties.

In one example, the cathode active material may be a sulfur-carbon composite.

The sulfur-carbon composite may be formed by applying a compound comprising the sulfur element to porous carbon, or by melting the compound and mixing it with carbon. At this time, the content ratio of carbon and sulfur in the sulfur-carbon composite may be, for example, in a ratio of 5:95 to 50:50 on the basis of mass, but is not limited thereto.

The carbon may be crystalline or amorphous carbon, which is not limited as long as it is conductive carbon, and may be, for example, graphite, carbon black, active carbon fiber, inactive nanofiber, carbon nanotube or carbon fabric, and the like.

The present application also relates to a composition for forming a cathode active layer of a lithium-sulfur secondary battery comprising the acrylic binder.

The composition according to the present application can be utilized in foaming a cathode active layer for a lithium-sulfur secondary battery which can effectively prevent the elution of lithium polysulfide ($LiS_x$) to represent excellent cycle characteristics and can secure the electrochemical characteristics by excellent dispersion characteristics of the conductive material in the composition and the formation and maintenance of the secondary structure depending on the charge-discharge mechanism.

In one example, the composition for forming a cathode active layer of a lithium-sulfur secondary battery according to the present application comprises the acrylic binder, the cross-linking agent, the cathode active material and the conductive material, as described above.

As described above, the acrylic binder contained in the composition of the present invention comprises polymerized units of a first polymerizable monomer having a polar functional group interacting with the cathode active material and polymerized units of a second polymerizable monomer having a cross-linkable functional group, and for example, may be contained in the composition in a content ratio of 0.01 to 10 parts by weight, relative to 100 parts by weight of the total solid content of the composition. In such a range, it is possible to secure desired binding properties, to effectively prevent the elution phenomenon of lithium polysulfide ($LiS_x$), and to secure the dispersion characteristics for the conductive material and the formation and maintenance characteristics of the secondary structure.

As described above, the cathode active material has a compound comprising a sulfur element, and specifically, may be a sulfur-carbon composite. Also, the sulfur-carbon composite may be formed by applying a compound containing a sulfur element to porous carbon, or by melting the compound and mixing it with carbon. At this time, the content ratio of carbon and sulfur in the sulfur-carbon composite may be, for example, in a ratio of 5:95 to 50:50 on the basis of mass. As the kind of carbon, the above-described graphite, and the like can also be adopted and used without limitation.

Such a cathode active material may be contained in the composition in a ratio of 30 to 95 parts by weight, relative to 100 parts by weight of the total solid content of the composition, but is not limited thereto, and the range may be appropriately changed in consideration of the performance of the desired battery.

The composition of the present application comprises a conductive material. In the lithium-sulfur secondary battery, in order to overcome the problem due to the low electrical conductivity of sulfur, the conductive material should be included in the active material, but when the amount of the conductive material is excessively large, an aggregation phenomenon of the conductive material may also occur due to deterioration of the dispersion characteristics and the energy density of the entire battery may also be lowered.

In the case of the present application, by using the acrylic binder having excellent dispersibility to the conductive material, the conductive material is contained in the composition in an amount within the range that does not lower the energy density of the entire battery while the aggregation phenomenon of the conductive material does not occur.

In one example, the conductive material may be included in the composition in a ratio of 2 to 70 parts by weight, 10 to 70 parts by weight, 15 to 70 parts by weight or 18 to 70 parts by weight, relative to 100 parts by weight of the total solid content of the composition.

In one example, as the conductive material, graphite such as natural graphite or artificial graphite; carbon black such as carbon black, acetylene black, Ketjen black, panel black, furnace black, lamp black, and summer black; conductive fibers such as carbon fibers or metal fibers; metal powders such as carbon fluoride, aluminum, and nickel powders; a conductive whisker such as zinc oxide and potassium titanate; a conductive metal oxide such as titanium oxide; or a conductive material such as polyaniline, polythiophene, polyacetylene, polypyrrole, or a polyphenylene derivative, and the like can be used, without being limited thereto.

As the conductive material, for example, one having a particle diameter of 40 nm or less and a surface area of 1,000 m$^2$/g or more can be used, without being limited thereto.

The composition of the present application also comprises a cross-linking agent. The cross-linking agent can provide a cross-linked structure in the active layer by performing cross-linking between the cross-linkable functional groups in the acrylic binder through a drying process or the like.

The cross-linking agent may be, for example, a multifunctional cross-linking agent.

In the present application, the term "multifunctional cross-linking agent" may mean a multifunctional compound with bifunctionality or more containing two or more functional groups per molecule, for example, a multifunctional compound having two to six functional groups per molecule, wherein the functional groups are capable of reacting with the cross-linkable functional group of the acrylic binder. The two or more functional groups contained in one molecule may be either identical to or different from one another.

Specifically, the multifunctional cross-linking agent may be a compound containing one or more, for example, one or two functional groups, such as an alkoxysilane group, a carboxyl group, an acid anhydride group, a vinyl ether group, an amine group, a carbonyl group, an isocyanate group, an epoxy group, an aziridinyl group, a carbodiimide group or an oxazoline group, as the functional group capable of reacting with the cross-linkable functional group, can be used.

The multifunctional cross-linking agent having a carboxyl group may be, for example, an aromatic dicarboxylic acid such as o-phthalic acid, isophthalic acid, terephthalic acid, 1,4-dimethyl-terephthalic acid, 1,3-dimethyl-isophthalic acid, 5-sulfo-1, 3-dimethyl-isophthalic acid, 4,4-biphenyl dicarboxylic acid, 1,4-naphthalene dicarboxylic acid, 2,6-naphthalene dicarboxylic acid, norbornene dicarboxylic acid, diphenylmethane-4,4'-dicarboxylic acid, and phenyl indane dicarboxylic acid; an aromatic dicarboxylic acid anhydride such as phthalic anhydride, 1,8-naphthalenedicarboxylic acid anhydride and 2,3-naphthalene dicarboxylic acid anhydride; an alicyclic dicarboxylic acid such as hexahydrophthalic acid; an alicyclic dicarboxylic acid anhydride such as hexahydrophthalic anhydride, 3-methyl-hexahydrophthalic anhydride, 4-methyl-hexahydrophthalic anhydride and 1,2-cyclohexane dicarboxylic acid anhydride; an aliphatic dicarboxylic acid such as oxalic acid, malonic acid, succinic acid, adipic acid, sebacic acid, azelaic acid, suberic acid, maleic acid, chloromaleic acid, fumaric acid, dodecanedioic acid, pimelic acid, citraconic acid, glutaric acid, itaconic acid, and the like.

In one example, the multifunctional cross-linking agent having an acid anhydride group may be pyromellitic acid anhydride, benzophenone tetracarboxylic acid dianhydride, biphenyltetracarboxylic acid dianhydride, oxydiphthalic acid dianhydride, diphenyl sulfone tetracarboxylic acid dianhydride, diphenyl sulfide tetracarboxylic acid dianhydride, butane tetracarboxylic acid dianhydride, perylene tetracarboxylic acid dianhydride or naphthalene tetracarboxylic acid dianhydride, and the like.

In one example, the multifunctional cross-linking agent having a vinyl ether group may be ethylene glycol divinyl ether, diethylene glycol divinyl ether, triethylene glycol divinyl ether, tetraethylene glycol divinyl ether, pentaerythritol divinyl ether, propylene glycol divinyl ether, dipropylene glycol divinyl ether, tripropylene glycol divinyl ether, neopentyl glycol divinyl ether, 1,4-butanediol divinyl ether, 1,6-hexanediol divinyl ether, glycerol divinyl ether, trimethylolpropane divinyl ether, 1,4-dihydroxy-cyclohexane divinyl ether, 1,4-dihydroxymethyl cyclohexane divinyl ether, hydroquinone divinyl ether, ethylene oxide-modified hydroquinone divinyl ether, ethylene oxide-modified resorcinoldivinyl ether, ethylene oxide-modified bisphenol A divinyl ether, ethylene oxide-modified bisphenol S divinyl ether, glycerol trivinyl ether, sorbitol tetravinyl ether, trimethylolpropane trivinyl ether, pentaerythritol trivinyl ether, pentaerythritol tetravinyl ether, dipentaerythritol hexavinyl ether, dipentaerythritol polyvinyl ether, ditrimethylolpropane tetravinyl ether or ditrimethylolpropane polyvinyl ether, and the like.

In one example, the multifunctional cross-linking agent having an amine group may be aliphatic diamines such as ethylene diamine and hexamethylene diamine; cycloaliphatic diamines such as 4,4'-diamino-3,3'-dimethyl dicyclohexylmethane, 4,4'-diamino-3,3'-dimethyl dicyclohexyl, diaminocyclohexane and isophorone diamines; or aromatic diamines such as xylene diamine, and the like.

In one example, the multifunctional cross-linking agent having an isocyanate group may be aromatic polyisocyanates such as 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanate toluene, 1,3,5-triisocyanate benzene, dianisidine diisocyanate, 4,4'-diphenyl ether diisocyanate, 4,4',4"-triphenylmethane triisocyanate and xylylene diisocyanate; aliphatic polyisocyanates such as trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate and 2,4,4-tetramethyl hexamethylene diisocyanate; aromatic polyisocyanates such as ω,ω'-diisocyanate-1,3-dimethylbenzene, ω,ω'-diisocyanate-1,4-dimethylbenzene, diisocyanate-1,4-diethylbenzene, 1,4-tetramethyl xylylene diisocyanate, 1,3-tetramethyl xylene diisocyanate; alicyclic polyisocyanates such as 3-isocyanate methyl-3,5,5-trimethyl cyclohexyl isocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis (cyclohexyl isocyanate) and 1,4-bis (isocyanatomethyl) cyclohexane or a reaction product of at least one polyisocyanate described above and a polyol, and the like.

The specific kind of the multifunctional cross-linking agent can be determined according to the kind of the cross-linkable functional group contained in the acrylic polymer.

The cross-linking agent may be contained in the composition in a ratio of 0.0001 to 1 part by weight relative to 100 parts by weight of the total solid content of the composition for forming an active layer.

The composition of the present application may further comprise a conductive material dispersant in addition to the above-mentioned components. The conductive material dispersant may help to perform pasting of the composition by dispersing the non-polar carbon-based conductive material.

The kind of the conductive material dispersant is those that the above-mentioned object can be achieved, which can be exemplified by a cellulose-based compound such as carboxymethyl cellulose (CMC) starch, hydroxypropyl cellulose or regenerated cellulose.

The conductive material dispersant may be contained in the composition in a ratio of 0.001 to 19.99 parts by weight relative to 100 parts by weight of the total solid content of the composition for forming an active layer.

The composition for forming an active layer of the present application may further comprise a non-acrylic binder in addition to the acrylic binder. The non-acrylic binder may attach the cathode active material to the current collector and may play a role to be capable of further enhancing resistance to dissolution for the electrolyte.

In one example, the non-acrylic binder may be a fluororesin binder including polyvinylidene fluoride (PVDF) or polytetrafluoroethylene (PTFE), and the like; a rubber binder including styrene-butadiene rubber, acrylonitrile-butadiene rubber or styrene-isoprene rubber, and the like; a polyalcohol binder; a polyolefin binder including polyethylene or polypropylene, and the like; a polyimide binder; a polyester binder, a mussel adhesive; or a silane binder, and the like, but is not limited thereto.

The non-acrylic binder may be included in the composition in a ratio of, for example, 0.001 to 19.99 parts by weight, relative to 100 parts by weight of the total solid content of the composition for forming an active layer.

Also, the composition may further comprise a solvent.

The type of the solvent can be appropriately set in consideration of the intended performance and the like, and for example, an organic solvent such as N-methyl-2-pyrrolidone, methanol, ethanol, propylene carbonate, ethylene carbonate, butylenes carbonate, dimethyl carbonate, diethyl carbonate, gamma-butylolactone, 1,2-dimethoxyethane, tetrahydrofuran, 2-methyltetrahydrofuran, dimethylsulfoxide, formamide, dimethylformamide, acetonitrile, nitromethane, methyl formate, methyl acetate, phosphoric acid triester, trimethoxymethane, sulfolane, methylsulfolane, 1,3-dimethyl-2-imidazolidinone, a propylene carbonate derivative, a tetrahydrofuran derivative, methyl propionate or ethyl propionate, or water can be used, but water is preferred in consideration of the drying temperature or environmental effects.

The ratio of the solvent contained in the composition can be suitably selected in consideration of the desired coating property and the like.

Furthermore, various known additives may be further included in the composition for forming the cathode active layer of the lithium-sulfur secondary battery.

In one example, the additive may be one or more selected from transition metal elements, IIIA group elements, IVA group elements, sulfur compounds of these elements, and sulfur alloys of these elements.

As the transition metal element, for example, Sc, Ti, V, Cr, Mn, Fe, Co, Ni, Cu, Zn, Y, Zr, Nb, Mo, Tc, Ru, Rg, Pd, Os, Ir, Pt, Au or Hg, and the like can be included, as the IIIA group element, for example, Al, Ga, In or Ti, and the like can be included, and as the IVA group element, Ge, Sn or Pb, and the like can be included.

The present application also relates to a cathode for a lithium-sulfur secondary battery.

The cathode of the present application comprises a current collector and an active layer. The active layer is formed using the above-described composition for forming an active layer, and comprises an acrylic binder, a cross-linking agent, a conductive material and an active material, and the like.

That is, the cathode for the lithium-sulfur secondary battery of the present application has a current collector; and an active layer formed on the current collector and comprising an acrylic binder. In addition, the acrylic binder comprises polymerized units of a first polymerizable monomer having a polar functional group interacting with the cathode active material and polymerized units of a second polymerizable monomer having a cross-linkable functional group.

In the present application, the current collector may be selected without particular limitation as long as it is generally used in a cathode for a lithium-sulfur secondary battery.

As the current collector, for example, stainless steel, aluminum, nickel, titanium, calcined carbon or aluminum, and the like can be used, and if necessary, the surface of the stainless steel or the like may be subjected to surface treatment using carbon, nickel, titanium or silver.

If necessary, fine irregularities may be formed on the surface of the current collector, and such irregularities can help improve the adhesion force with the active layer. When the surface of the current collector is subjected to roughening, the method is not particularly limited, and for example, a known method such as mechanical polishing, electrolytic polishing or chemical polishing methods can be applied.

The current collector may have, for example, various forms such as films, sheets, foils, nets, porous bodies, foams or nonwoven fabrics.

The thickness of the current collector is not particularly limited and may be set in an appropriate range in consideration of the mechanical strength of the cathode, productivity, capacity of the battery, and the like.

The cathode for a lithium-sulfur secondary battery has an active layer formed on the current collector. The active layer can be formed using the above-described composition.

In one example, the active layer may be formed on the current collector by applying a composition for forming an active layer comprising an acrylic binder, a cross-linking agent, a cathode active material, a conductive material and other additives on the current collector using a known application method, followed by the drying process, and the like.

As the application process, any known application method including, for example, a bar coating method, a screen coating method, a doctor blade method, a dipping method, a reverse roll method, a direct roll method, a gravure method or an extrusion method, and the like can be applied thereto without limitation.

Also, the application amount of the composition for the active layer composition of the present application on the current collector is not particularly limited and for example, may be adjusted within a range in which an active layer with a desired thickness can be finally formed.

The drying process is also not particularly limited, but a method of removing the solvent in the composition for forming an active layer and also applying heat to the extent that a cross-linked structure can be realized by a cross-linking agent may be used, without being limited thereto.

Specifically, the drying may be performed by a method of hot air drying it in a temperature range of 50 to 100° C., or 60 to 90° C. for 1 hour to 24 hours or 10 hours to 15 hours. In particular, the present application can dry the electrode at a temperature lower than the sublimation temperature of sulfur, which is a cathode active material, and thus can be excellent in terms of processability.

Furthermore, known processes required for the production of the cathode before or after the process of forming the active layer, for example, a rolling or drying process, and the like can be carried out, if necessary.

The active layer may have, for example, a thickness in a range of 1 to 200 μm, 20 to 200 μm, or 30 to 200 μm, without being thereto, and the thickness range may be changed in consideration of the desired performance and the like.

The present application also relates to a lithium-sulfur secondary battery comprising such a cathode for a lithium-sulfur secondary battery.

The lithium-sulfur secondary battery may comprise an anode comprising lithium metal or a lithium alloy as an anode active material; a cathode comprising the current collector and the active layer, as described above; a separator positioned between the cathode and the anode; and an electrolyte impregnating the anode, the cathode and the separator, and comprising a lithium salt and an organic solvent.

The lithium alloy of the anode active material is an alloy of lithium and a metal selected from the group consisting of Na, K, Rb, Cs, Fr, Be, Mg, Ca, Sr, Ba, Ra, Al and Sn, but is not limited thereto.

The separator positioned between the cathode and the anode separates or insulates the cathode and the anode from each other and permits transport of lithium ions between the cathode and the anode, which may be composed of a porous nonconductive or insulating material. Such a separator may also be an independent member such as a film, or may also be a coating layer added to the cathode and/or the anode.

The material of the separator includes, but is not limited to, for example, polyolefin such as polyethylene and polypropylene, a glass fiber filter paper, and a ceramic material, and its thickness may be about 5 to about 50 μm, specifically about 5 to about 25 μm.

The electrolyte impregnating the anode, the cathode and the separator comprises a lithium salt and an organic solvent.

The lithium salt may have a concentration of about 0.2 to 2.0 M, depending on various factors such as the precise composition of the electrolyte solvent mixture, the solubility of the salt, the conductivity of the dissolved salt, the charge and discharge conditions of the battery, the operating temperature and other factors known in the lithium battery field. As an example of the lithium salt for use in the present application, one or more from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$ and $LiN(SO_2CF_3)_2$ may be included.

As the organic solvent, a single solvent or two or more mixed organic solvents may also be used. When two or more mixed organic solvents are used, it is preferred to select at least one solvent from two or more groups among a weak polar solvent group, a strong polar solvent group, and a lithium metal protective solvent group.

The weak polar solvent is defined as a solvent having a dielectric constant of less than 15 which is capable of dissolving a sulfur element among an aryl compound, a bicyclic ether and an acyclic carbonate, and the strong polar solvent is defined as a solvent having a dielectric constant of more than 15 which is capable of dissolving lithium polysulfide among a bicyclic carbonate, a sulfoxide compound, a lactone compound, a ketone compound, an ester compound, a sulfate compound, and a sulfite compound, and the lithium metal protective solvent is defined as a solvent having a charge-discharge cycle efficiency of 50% or more, which forms a stable SEI (solid electrolyte interface) on lithium metal, such as a saturated ether compound, an unsaturated ether compound, and a heterocyclic compound comprising N, O, S or a combination thereof.

A specific example of the weak polar solvent includes xylene, dimethoxyethane, 2-methyltetrahydrofuran, diethyl carbonate, dimethyl carbonate, toluene, dimethyl ether, diethyl ether, diglyme or tetraglyme, and the like.

A specific example of the strong polar solvent includes hexamethyl phosphoric triamide, γ-butyrolactone, acetonitrile, ethylene carbonate, propylene carbonate, N-methylpyrrolidone, 3-methyl-2-oxazolidone, dimethylformamide, sulfolane, dimethylacetamide, dimethylsulfoxide, dimethylsulfate, ethylene glycol diacetate, dimethylsulfite or ethylene glycol sulfite, and the like.

A specific example of the lithium protective solvent includes tetrahydrofuran, ethylene oxide, dioxolane, 3,5-dimethylisoxazole, furan, 2-methylfuran, 1,4-oxane or 4-methyldioxolane, and the like.

The present application also provides a battery module comprising the lithium-sulfur secondary battery as a unit cell.

The battery module may be specifically used as a power source for an electric vehicle, a hybrid electric vehicle, a plug-in hybrid electric vehicle or an energy storage system.

Advantageous Effects

The present application can provide an acrylic binder contained in a cathode active layer of a lithium-sulfur secondary battery, which can effectively prevent dissolution of a cathode active material and ultimately ensure excellent cycle performance, and a composition comprising the same.

Also, the present application can provide a composition for forming a cathode active layer of a lithium-sulfur secondary battery, which can comprise an appropriate amount of a conductive material by having excellent dispersion property and the formation and maintenance of the secondary structure of the conductive material, and a cathode comprising the active layer formed therefrom.

Furthermore, since in the drying process of the active layer the drying can be performed at a temperature condition lower than the sublimation temperature of sulfur, the present application can be superior in terms of processability.

Mode for Invention

Hereinafter, the present invention will be described with reference to examples thereof, but the following examples are intended to illustrate the present application, and it is apparent to those having ordinary skill in the art that the scope of the present application is not limited by the following examples.

The physical properties shown in these examples and comparative examples were evaluated in the following manner.

[1. Method of Measuring Conversion Rate of Binder]
Analytical Instrument
Gas chromatography (PerkinElmer)
Analysis Conditions
Solvent: tetrahydrofuran
Initial temperature: 3 minutes at 50° C., Ramp: 30° C./min at 200° C.
Injection volume: 0.5 μl
Analysis Procedure The reaction product is diluted in a solvent at a concentration of 20 mg/mL and 5 mg/mL of toluene is added as a standard substance, and then the gas chromatography is measured. The conversion rate is calculated by the ratio change of the monomer peak size, relative to the toluene peak.

$$\text{Conversion rate}(\%) = (A\text{ini} - A\text{fin})/A\text{ini} \times 100$$

Aini: an area relative ratio of the monomer peak at the start of the reaction, relative to the toluene peak
Afin: an area relative ratio of the monomer peak at the end of the reaction, relative to the toluene peak

[2. Evaluation of Molecular Weight of Binder]

A weight average molecular weight (Mw) and molecular weight distribution (PDI) were measured using GPC under the following conditions, and the measurement results were converted by using standard polystyrenes of the Agilent system in generation of calibration curves.

<Measurement Conditions>

Measuring instrument: Agilent GPC (Agilent 1200 series, U.S.)
Column: Two PL Mixed B connected
Column temperature: 40° C.
Eluent: tetrahydrofuran or N,N-dimethylformaldehyde
Flow rate: 1.0 mL/min
Concentration: ~1 mg/mL (100 μl injection)

[3. Formation of Cathode Active Layer]

A carbon-sulfur composite was obtained through a wet ball milling process of a mixture in which a weight ratio of carbon powder: sulfur is 10:90. A self-emulsifying isocyanate cross-linking agent AQ-130 (manufactured by Nippon Polyurethane Industry Co., Ltd.) was prepared in a 20% emulsion state just before use. A cathode slurry was prepared by adding a composition of the carbon-sulfur composite 75.0 wt %: Super-P (conductive material) 20.0 wt %: a binder 4.5 wt %: a cross-linking agent 0.5 wt % to water as a solvent, and then coated on an aluminum current collector having a thickness of about 20 μm and dried at 80° C. for 12 hours to prepare a cathode having a loading of 2.0 mAh/cm².

[4. Manufacture of Lithium-Sulfur Secondary Battery]

The cathode prepared according to the method of the present application was used, a lithium foil having a thickness of about 150 μm was used as an anode, and a polyolefin membrane (Celgard® 2400) was used as a separator. An electrolyte prepared by mixing TEGDME (Tetraethylene glycol dimethyl ether), DOL (1,3-dioxolane) and DME (dimethoxyethane), in which 1M of $LiN(CF_3SO_2)_2$ and 0.1 M of $LiNO_3$ were dissolved, was used as the electrolyte to complete the manufacture of a lithium-sulfur secondary battery.

[5. Evaluation of Cycle Characteristics]

Instrument: Charger-discharger of 100 mA class
Charging: 0.1C, constant current/constant voltage mode
Discharge: 0.1C, constant current mode (1.5V)
Cycle temperature: 25° C.

POLYMER PRODUCTION EXAMPLE 1—PRODUCTION OF ACRYLIC BINDER (A1)

In a 250 mL round bottom flask, 7.5 g of polyethyleneoxide methylether methacrylate, 4.5 g of N-vinyl-2-pyrrolidone, 1.5 g of acrylonitrile, 1.5 g of 2-hydroxyethyl methacrylate and 60 g of water were charged and the inlet was sealed. Oxygen was removed through nitrogen bubbling for 30 minutes, the reaction flask was immersed in an oil bath preheated to 60° C., and then 0.15 g of VA-057 (Wako Chemical) was added to initiate the reaction. When the conversion rate after 24 hours was 99%, the reaction was terminated to obtain an acrylic binder having a weight average molecular weight of about 320,000.

POLYMER PRODUCTION EXAMPLES 2 TO 4—PRODUCTION OF ACRYLIC BINDERS (A2, A3, A4)

An acrylic binder was prepared in the same manner as in Production Example 1, except that the kinds and contents of the monomers used upon the polymerization were adjusted as in Table 1 below.

TABLE 1

| Classification | Type | A1 | A2 | A3 | A4 |
|---|---|---|---|---|---|
| The first polymerizable monomer | PEOMA | 50 | 50 | 50 | 50 |
| (part by weight) | VP | 30 | 35 | 30 | 30 |
|  | AN | 10 |  | 10 | 10 |
| The second polymerizable monomer | HEMA | 10 | 10 |  | 5 |
| (part by weight) | DMAEMA |  |  | 10 | 5 |
| Alkyl (meth)acrylate (part by weight) | MMA |  | 5 |  |  |
|  | Mw | 320,000 | 420,000 | 350,000 | 350,000 |

PEOMA: Poly(ethylene oxide) methyl ether methacrylate

VP: N-vinyl-2-pyrrolidone

AN: acrylonitrile

HEMA: 2-hydroxyethyl methacrylate

DMAEMA: 2-(N,N-dimethylamino)ethyl methacryalte

MMA: methacrylic acid

EXAMPLE 1—MANUFACTURE OF LITHIUM-SULFUR SECONDARY BATTERY

A lithium-sulfur secondary battery was manufactured using a cathode having an active layer comprising an acrylic binder (A1) prepared according to Production Example 1 above. The charge/discharge was evaluated with 0.1 C/0.1 C by 50 cycles between 1.5 V and 2.8 V, and then the remaining capacity in the second cycle and the remaining capacity in the 50th cycle were calculated relative to the initial capacity to measure the capacity retention rate and the result was shown in Table 2.

EXAMPLES 2 TO 4—MANUFACTURE OF LITHIUM-SULFUR SECONDARY BATTERY

A battery was manufactured in the same manner as in Example 1, except that a lithium-sulfur secondary battery was produced using a cathode having an active layer comprising each acrylic binder (A2, A3, A4) prepared according to Production Examples 2 to 4, and the capacity retention rate was evaluated and shown in Table 2.

COMPARATIVE EXAMPLES 1 AND 2—MANUFACTURE OF LITHIUM-SULFUR SECONDARY BATTERY

A battery was manufactured in the same manner as in Example 1, except that a polyvinylidene fluoride (PVDF) binder or a mixture of styrene-butadiene rubber (SBR) and carboxymethyl cellulose (CMC) in a ratio of 1:1 was used as a cathode binder instead of acrylic binders (A1, A2, A3, A4), and the capacity retention rate was evaluated and shown in Table 2.

TABLE 2

|  | Example | | | | Comparative Example | |
| --- | --- | --- | --- | --- | --- | --- |
|  | 1 | 2 | 3 | 4 | 1 | 2 |
| Binder | A1 | A2 | A3 | A4 | PVDF | SBR + CMC |
| Capacity retention rate (%) | 88 | 86 | 90 | 90 | 75 | 82 |

As shown in Table 2, the acrylic binders of Examples showed a high capacity retention rate as the cycle progresses, which result is determined that the polar functional groups included in the acrylic binders of Examples strongly interacted with sulfur, and besides, the cross-linked binder network effectively inhibited the dissolution of sulfur into the electrolyte.

As can be seen from the above, the acrylic binder according to the present application has an excellent effect in improving the cycle characteristics of the lithium-sulfur secondary battery, and the battery, to which the cathode having the active layer comprising the acrylic binder is applied, exhibits excellent cycle performance.

The invention claimed is:

1. A composition for forming a cathode active layer of a lithium-sulfur secondary battery, comprising:
    an acrylic binder,
    a cathode active material, and
        a conductive material,
    wherein the acrylic binder consists essentially of:
        first polymerized units of a first polymerizable monomer having a polar functional group interacting with the cathode active material;
        second polymerized units of a second polymerizable monomer having a cross-linkable functional group that is a hydroxyl group, or a carboxy group; and
        third polymerized units of at least one alkyl (meth) acrylate,
    wherein the cathode active material is a sulfur-carbon composite,
    wherein the acrylic binder comprises 40 to 99.5 parts by weight of the first polymerized units, 0.5 to 30 parts by weight of the second polymerized units and 5 to 30 parts by weight of the third polymerized units,
    wherein the first polymerizable monomer comprises a polymerizable monomer having an alkylene oxide group,
    wherein the second polymerizable monomer having the cross-linkable functional group that is the hydroxyl group is at least one selected from the group consisting of hydroxyalkyl (meth)acrylate, hydroxypolyethylene glycol (meth)acrylate and hydroxypolypropylene glycol (meth)acrylate, and
    wherein the polymerizable monomer having the alkylene oxide group is at least one selected from the group consisting of an alkoxy alkyleneglycol (meth) acrylic acid ester, an alkoxy dialkyleneglycol (meth) acrylic acid ester and an alkoxy polyethyleneglycol (meth)acrylic acid ester.

2. The composition for forming a cathode active layer of a lithium-sulfur secondary battery according to claim 1, wherein the acrylic binder is contained in a ratio of 0.01 to 10 parts by weight, relative to 100 parts by weight of a solid content of the composition.

3. The composition for forming a cathode active layer of a lithium-sulfur secondary battery according to claim 1, wherein the cathode active material is contained in a ratio of 30 to 95 parts by weight, relative to 100 parts by weight of a solid content of the composition.

4. The composition for forming a cathode active layer of a lithium-sulfur secondary battery according to claim 1, further comprising a cross-linking agent, wherein the cross-linking agent comprises a functional group capable of reacting with the cross-linkable functional group in the acrylic binder, and
    wherein the cross-linking agent is contained in a ratio of 0.0001 to 1 part by weight, relative to 100 parts by weight of the solid content of the composition.

5. The composition for forming a cathode active layer of a lithium-sulfur secondary battery according to claim 1, wherein the conductive material is contained in a ratio of 2 to 70 parts by weight, relative to 100 parts by weight of a solid content of the composition.

6. The composition for forming a cathode active layer of a lithium-sulfur secondary battery according to claim 1, further comprising a conductive material dispersant, wherein the conductive material dispersant is contained in a ratio of 0.001 to 19.99 parts by weight, relative to 100 parts by weight of a solid content of the composition.

7. The composition for forming a cathode active layer of a lithium-sulfur secondary battery according to claim 6, wherein the conductive material dispersant is carboxymethyl cellulose.

8. The composition for forming a cathode active layer of a lithium-sulfur secondary battery according to claim 1, wherein the acrylic binder has a glass transition temperature in a range of −80° C. to 50° C.

9. The composition for forming a cathode active layer of a lithium-sulfur secondary battery according to claim 1, wherein the acrylic binder comprises 50 to 99.5 parts by weight of the first polymerized units, 2 to 25 parts by weight of the second polymerized units and 5 to 30 parts by weight of the third polymerized units.

10. A cathode for a lithium-sulfur secondary battery having:
a current collector; and
an active layer formed on the current collector and comprising the composition according to claim 1.

11. The cathode for a lithium-sulfur secondary battery according to claim 10,
wherein the active layer has a thickness in a range of 1 μm to 200 μm.

12. A lithium-sulfur secondary battery comprising the cathode of claim 10.

13. A composition for forming a cathode active layer of a lithium-sulfur secondary battery, comprising:
an acrylic binder,
a cathode active material, and
a conductive material,
wherein the acrylic binder consists essentially of:
first polymerized units of a first polymerizable monomer having a polar functional group interacting with the cathode active material; and
second polymerized units of a second polymerizable monomer having a cross-linkable functional group that is a hydroxyl group, or a carboxy group,
wherein the cathode active material is a sulfur-carbon composite,
wherein the acrylic binder comprises 40 to 99.5 parts by weight of the first polymerized units and 0.5 to 30 parts by weight of the second polymerized units,
wherein the first polymerizable monomer comprises a polymerizable monomer having an alkylene oxide group,
wherein the second polymerizable monomer having the cross-linkable functional group that is the hydroxyl group is at least one selected from the group consisting of hydroxyalkyl (meth)acrylate, hydroxypolyethylene glycol (meth)acrylate and hydroxypolypropylene glycol (meth)acrylate, and
wherein the polymerizable monomer having the alkylene oxide group is at least one selected from the group consisting of an alkoxy alkyleneglycol (meth)acrylic acid ester, an alkoxy dialkyleneglycol (meth)acrylic acid ester and an alkoxy polyethyleneglycol (meth) acrylic acid ester.

* * * * *